United States Patent

[11] 3,603,439

| [72] | Inventors | Ervin I. Pietsch<br>St. Charles;<br>John L. Carney, Jr., St. Louis County, both of, Mo. |
|---|---|---|
| [21] | Appl. No. | 13,250 |
| [22] | Filed | Feb. 20, 1970 |
| [45] | Patented | Sept. 7, 1971 |
| [73] | Assignee | ACF Industries, Incorporated<br>New York, N.Y. |

[54] LOADING APPARATUS FOR RAILWAY HOPPER CARS
5 Claims, 9 Drawing Figs.

| [52] | U.S. Cl. | 193/25 R |
|---|---|---|
| [51] | Int. Cl. | B65g 11/10 |
| [50] | Field of Search | 193/6, 7, 12, 25, 30 |

[56] References Cited
UNITED STATES PATENTS

| 908,034 | 12/1908 | Pyleck | 193/25 |
|---|---|---|---|
| 1,520,440 | 12/1924 | Pyleck | 193/25 |

Primary Examiner—Evon C. Blunk
Assistant Examiner—I. Kenneth Silverman
Attorney—Eugene N. Riddle ABSTRACT: A loading apparatus particularly for loading a railway hopper car with a perishable bulk commodity, such as potatoes or oranges. The loading apparatus includes a flexible fabric chute reinforced circumferentially by a spiral spring wire and having a lower valve portion to control the discharge of the lading from the lower end of the chute. Rings or hoops are spaced along the height of the chute and have eyes thereon to guide ropes or the like for retracting or extending the chute as the hopper is filled with the lading.

LOADING APPARATUS FOR RAILWAY HOPPER CARS

BACKGROUND OF THE INVENTION

Loading devices and chutes for hoppers and the like have been employed heretofore. Some of these loading devices have comprised a plurality of metallic telescoping sections to permit retraction of the chute. Others have employed chains to withdraw or move the chute portions upwards during the loading operation.

BRIEF DESCRIPTION OF THE INVENTION

The present loading apparatus includes a flexible fabric chute having a spiral spring wire reinforcement which provides a bellows effect when the chute is retracted or contracted upon the filling of the hopper. A plurality of spaced rigid hoops or rings are mounted about the outer circumference of the chute and have guides which receive ropes. Four ropes are spaced at 90° about the circumference of the chute and have their lower ends secured to the lowermost hoop. Upon retracting of the ropes by a suitable winch, the fabric chute is drawn upwardly into a retracted position being contracted between the hoops. The lower end of the chute has a valve formed by a nonreinforced lower portion with the discharge opening being controlled by a pull member actuated from a position outside the hopper. The valve controls the rate of discharge from the chute at a rate generally the same as the rate of discharge into the chute so that the chute will remain filled with lading during the loading operation. Thus, the fall or drop of the lading into the upper end of the chute from a conveyor is held to a minimum.

The invention accordingly comprises the constructions hereinafter described, the scope of the invention being indicated in the following claims.

In the accompanying drawings, in which one of various possible embodiments of the invention is illustrated, FIG. 1 is a side elevation of a covered hopper railway car having the loading apparatus comprising the present invention thereon;

Figure 5:
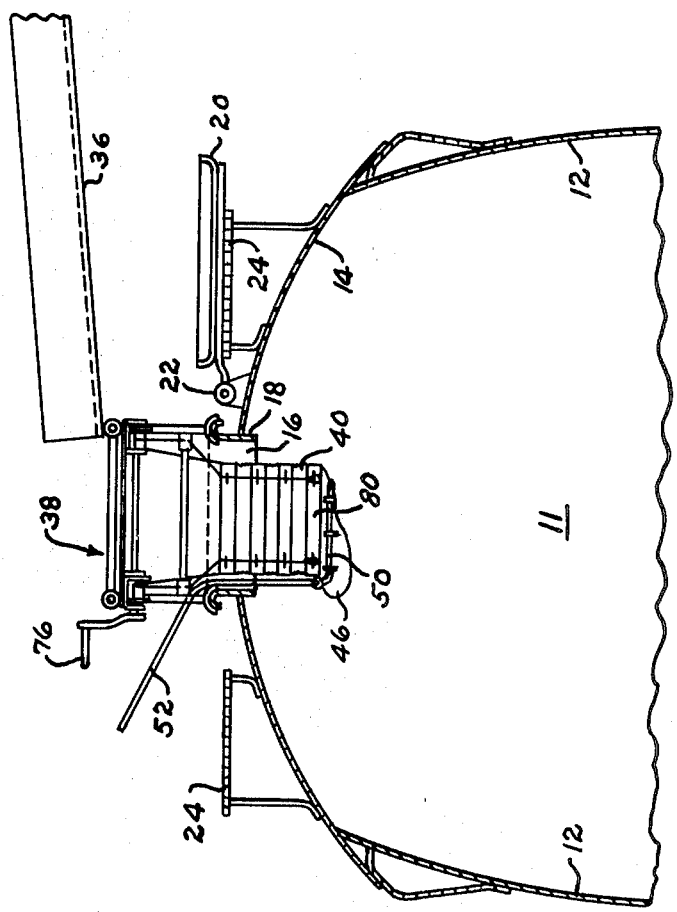
FIG. 5 is a section generally similar to FIG. 2 but showing the loading apparatus in its uppermost retracted position for the beginning or completion of a loading cycle.

Referring now to the drawings, a covered hopper railway car is generally indicated 10 and has a plurality of hoppers 11 formed by sides 12 and roof 14. A hatch opening 16 in roof 14 is defined by hatch fitting 18. An elongate hatch cover 20 is pivotally mounted at 22 to the upper portion of roof 14 and is adapted for movement between open and closed positions relative to opening 16. Cover 20 is adapted to seat on the upper surface of hatch fitting 18 when in closed position. A walkway 24 is mounted on each side of roof 14 and walkway 24 on one side of roof 14 is adapted to support cover 20 in open position as shown in FIG. 5 when pivoted to an open position.

Mounted adjacent the lower end of each hopper 11 is a bottom discharge structure generally indicated 26 and having a gate 28 mounted for movement between open and closed positions relative to a bottom discharge opening. A suitable rack and pinion combination generally indicated 30 is actuated by rotation of pinion shaft 32 thereby to open and close gate 28.

Figure 1:
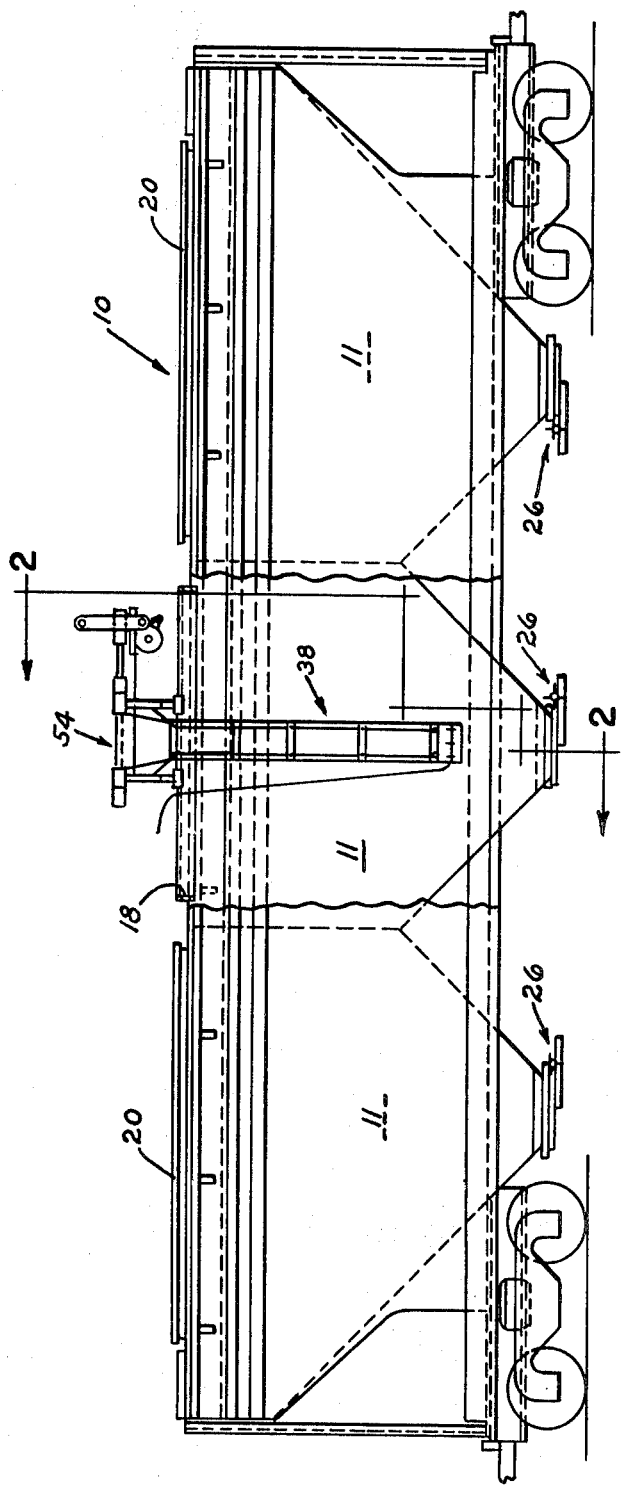
Figure 2:
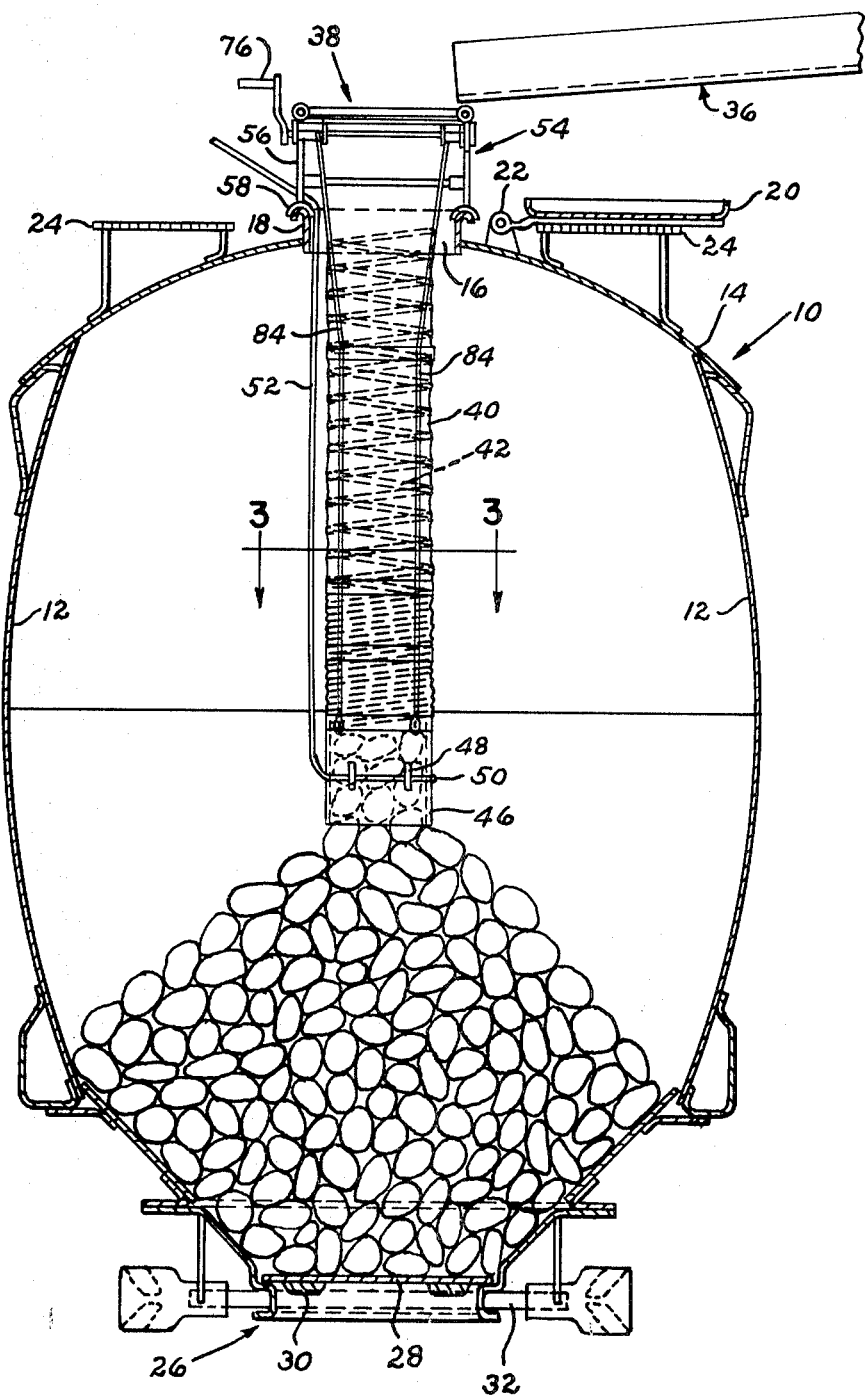
FIG. 2 is a section taken along line 2—2 of the railway car shown in FIG. 1 and showing the loading apparatus discharging a perishable bulk commodity, such as potatoes, into the hopper.
Figure 4:
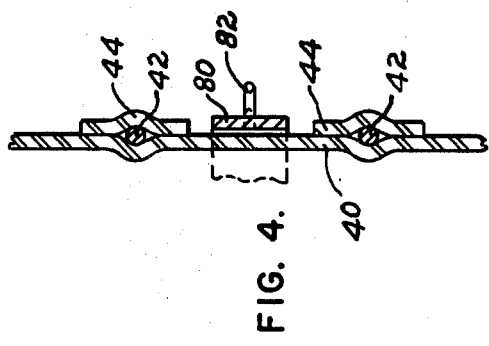
FIG. 4 is a section taken generally along line 4—4 of FIG. 3 and showing the spiral reinforcing for the loading chute.

As shown in FIG. 2, a conveyor generally indicated 36 transports the lading, such as potatoes, oranges, grapefruit, or the like, into the upper end of apparatus for loading the hoppers 11. The loading apparatus generally indicated 38 which comprises the present invention includes a fabric chute 40 which may be formed of canvas or a suitable duck material, and has a spiral wire reinforcing 42 extending about its circumference. A strip of material or fabric 44 is placed over the spiral wire reinforcing 42 as shown in FIG. 4 and is sewn to chute 40. Extending from the lower portion of chute 40 is a nonreinforced lower portion 46 having eyes 48 positioned about its circumference. A wire cable or other resilient cablelike member 50 fits within eyes 48 on lower portion 46 and a rope 52 is connected to cable 50. Rope 52 extends upwardly through the hatch opening 16 and a workman on walkway 24 may suitably control the size of the lower discharge opening for chute 40 by pulling on rope 52. The discharge rate is important as a perishable bulk commodity, such as potatoes or oranges, should be loaded into a hopper without any damage, such as bruising. This is achieved by having flexible chute 40 filled with the bulk commodity at all times so that only a small drop of the lading is obtained between conveyor 36 and the upper portion of the unloading apparatus 38. Also, the rate of downward movement of the bulk commodity within chute 40 should be of a rate so that the bulk commodity is not bruised or damaged while passing through the chute. Thus, by controlling the rate of discharge from lower end of chute 40, a completely filled chute can be provided even with a variation in flow of the bulk commodity from conveyor 36.

Figure 9:
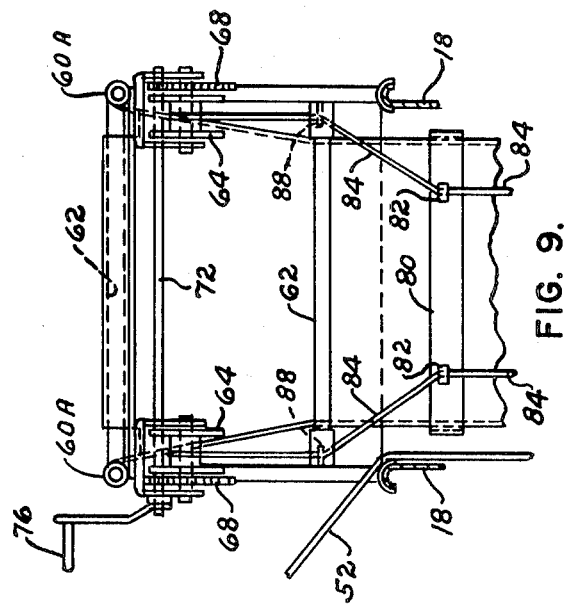
FIG. 9 is an end elevation of the upper support structure for the loading apparatus shown in FIG. 8.
Figure 8:
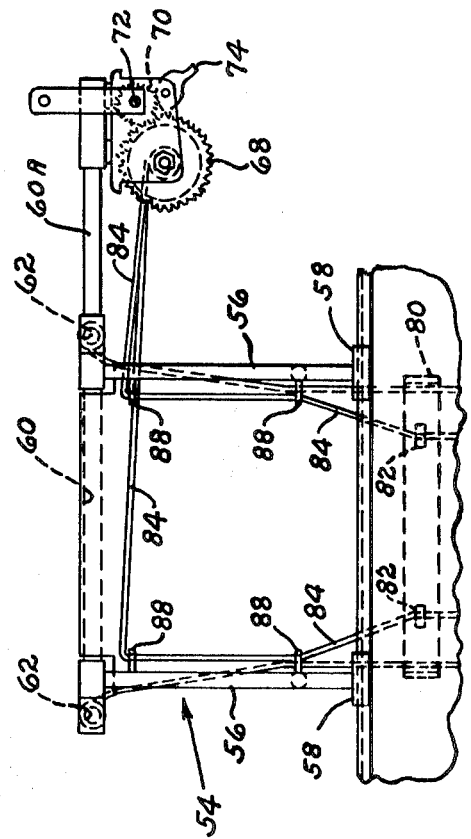
FIG. 8 is a side elevation of the upper portion of support structure for the loading apparatus.
Figure 6:
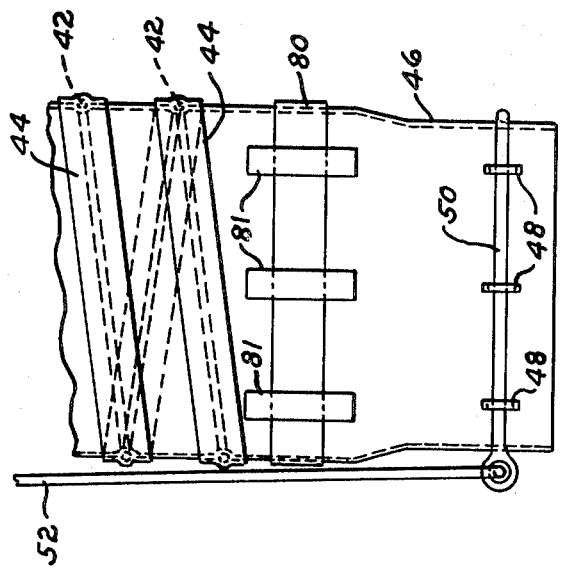
FIG. 6 is a side elevation showing the lower portion of the chute which is nonreinforced and forms a control valve to control the discharge of lading from the lower end of the chute.
Figure 7:
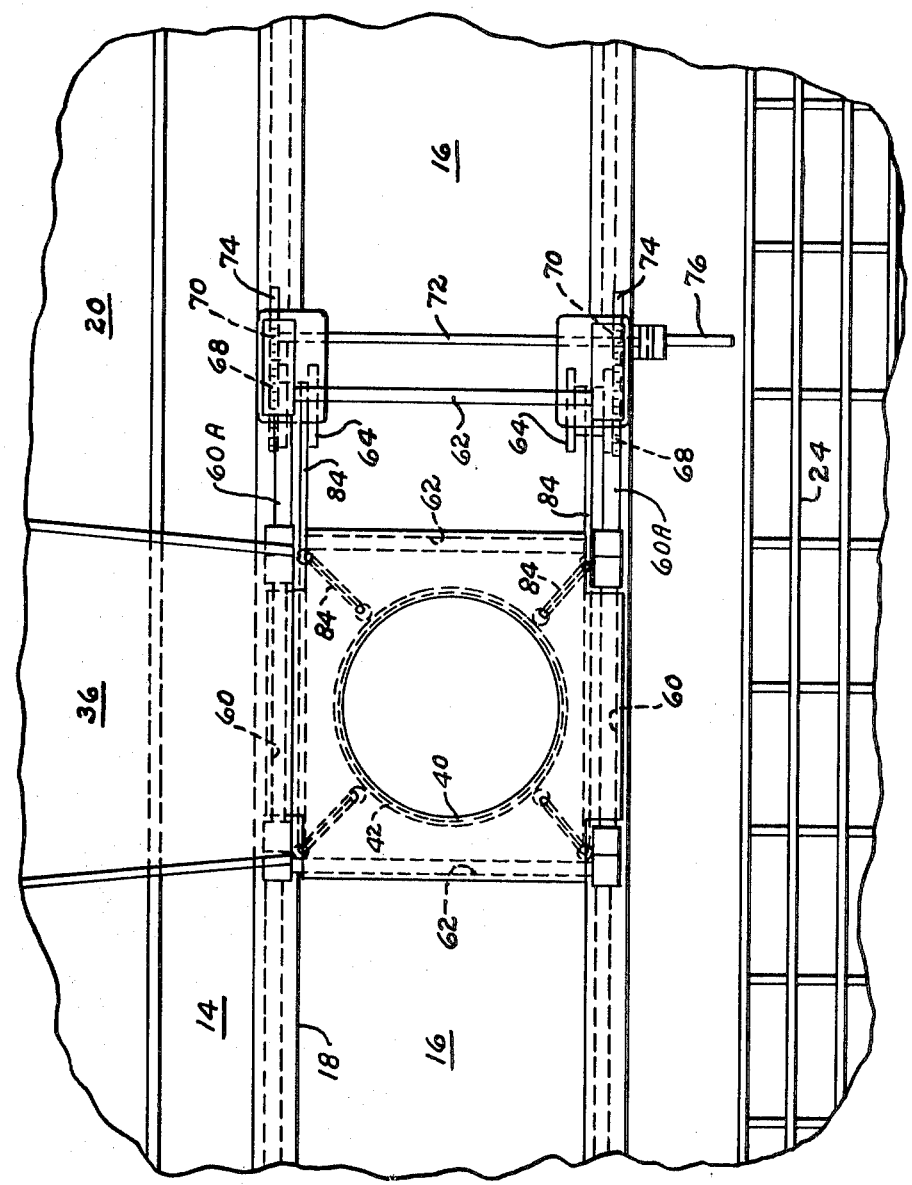
FIG. 7 is a top plan of the loading apparatus shown in FIGS. 1-6.

The supporting frame for chute 40 is generally indicated 54 and has a plurality of vertical members 56 with arcuate lower ends 58 adapted to fit on the upper surface of hatch fitting 18 such as shown in FIGS. 8 and 9. Upper longitudinal horizontal members 60 and transverse horizontal members 62 are adapted to support the upper end of chute 40 and chute 40 is secured about members 60 and 62 as shown particularly in FIG. 7. Members 60 extend outwardly and have overhanging end portions 60A which support a pair of spaced winches 64. Ratchet wheels 68 are engaged by drive spur gears 70 which are connected by drive shaft 72. A pawl 74 is provided for each ratchet wheel 68. A handcrank 76 is fixed to an end of shaft 72 and upon rotation of crank 76 spur gears 70 drive ratchet wheels 68 for retraction of chute 40.

Figure 3:
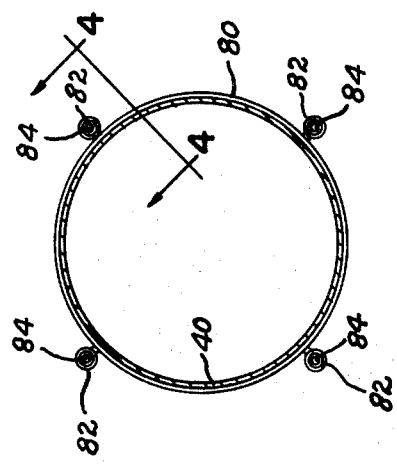
FIG. 3 is a section taken generally along line 3—3 of FIG. 2.

Spaced at 3- or 4-feet intervals along the length of chute 40 are hoops or rings 80. Each hoop 80 is mounted about the outer circumference of chute 40 and is secured thereto by suitable straps 81 stitched to chute 40. Each ring or hoop 80 has four guides or eyes 82 thereon particularly as shown in FIG. 3 spaced 90° about the circumference of ring 80. Fitting within eyes 82 are flexible cablelike members or ropes 84. The lower ends of ropes 84 are secured to the lowermost ring 80 and the upper ends of ropes 84 are wound about winches 64 as shown in FIG. 8. Guides 88 on vertical members 56 direct ropes 84 about winches 64. Ropes 84 upon rotation of shaft 72 by crank 76 are wound about winches 64 thereby to retract chute 40 to the position shown in FIG. 5.

What is claimed is:

1. Loading apparatus adapted to extend downwardly into a hopper for loading lading therein and comprising; a fabriclike chute, a spiral wirelike reinforcing secured about the circumference of the chute along a major portion of the length of the chute for rigidizing the chute while permitting the chute to be easily extended and contracted longitudinally, a plurality of hoops about the outer circumference of the chute and spaced along the length of the chute, guide means on the hoops, flexible cablelike members extending downwardly from the upper portion of the chute along the guide means on the hoops and having lower ends secured adjacent the lowermost hoop, and means adjacent the upper portion of the chute for selectively actuating the flexible members for contracting and extending the chute in a longitudinal direction.

2. A loading structure adapted to be positioned over a roof opening in a covered hopper railway car for extending downwardly into a hopper and comprising; a fabriclike chute, a spiral wire-type reinforcing secured about the circumference of the chute along a major portion of the length of the chute to permit the chute to be easily extended and contracted longitudinally, a plurality of rings extending about the outer circumference of the chute and spaced along the length of the chute, guide means on the rings spaced about the outer circumference of the rings at around 90° intervals, four flexible cablelike members extending downwardly from the upper portion of the chute along the guide means on the rings and having lower ends secured to the lowermost ring, and manual means adjacent the upper portion of the chute for actuating the flexible members to contract and extend the chute in a longitudinal direction.

3. A loading structure as set forth in claim 2 wherein said manual means comprises a winch mounted adjacent the upper end of the chute and said cablelike members are wound about said winch for withdrawing the chute from the lower portion of the associated hopper.

4. A loading structure as set forth in claim 2 wherein a support for the chute is adapted to be supported on the upper surface of the railway car, and said manual means includes a winch mounted on said support.

5. A loading structure adapted to be positioned over a roof opening in a covered hopper railway car for extending downwardly into a hopper and comprising; a fabriclike chute, a spiral wire-type reinforcing secured about the circumference of the chute along a major portion of the length of the chute to permit the chute to be easily extended and contracted longitudinally, a plurality of rings extending about the outer circumference of the chute and spaced along the length of the chute, guide means on the rings spaced about the outer circumference of the rings at around 90° intervals, four flexible cablelike members extending downwardly from the upper portion of the chute along the guide means on the rings and having lower ends secured to the lowermost ring, manual means adjacent the upper portion of the chute for actuating the cablelike members to contract and extend the chute, said chute having a nonreinforced lowermost portion, a bandlike member extending about the outer circumference of the nonreinforced lower portion, and a pull member connected to said bandlike member for drawing the bandlike member about the nonreinforced lower portion to control the discharge opening and the flow of lading from the lower end of the chute.